United States Patent
Torem et al.

(10) Patent No.: US 10,167,650 B2
(45) Date of Patent: Jan. 1, 2019

(54) CONCURRENT OPERATION OF MULTIPLE ROBOTIC POOL CLEANERS

(71) Applicant: Aquatron Robotic Technology Ltd., Afula (IL)

(72) Inventors: Ben-Zion Torem, Hoshaya (IL); Benjamin Attar, Kiryat Bialik (IL); Shahar Schloss, Haifa (IL)

(73) Assignee: Aquatron Robotic Technology Ltd., Afula (IL)

( * ) Notice: Subject to any disclaimer, the term of this patent is extended or adjusted under 35 U.S.C. 154(b) by 23 days.

(21) Appl. No.: 15/232,984

(22) Filed: Aug. 10, 2016

(65) Prior Publication Data

US 2018/0044936 A1 Feb. 15, 2018

(51) Int. Cl.
*E04H 4/16* (2006.01)

(52) U.S. Cl.
CPC ................................. *E04H 4/1654* (2013.01)

(58) Field of Classification Search
CPC ..................................................... E04H 4/1654
See application file for complete search history.

(56) References Cited

U.S. PATENT DOCUMENTS

| | | | |
|---|---|---|---|
| 5,569,371 A * | 10/1996 | Perling | E04H 4/1654 15/1.7 |
| 6,758,226 B2 | 7/2004 | Porat | |
| 8,965,623 B2 * | 2/2015 | Rakshit | G05D 1/0276 318/568.12 |
| 9,086,274 B2 | 7/2015 | Leonessa et al. | |
| 2009/0057238 A1 | 3/2009 | Garti | |
| 2014/0303810 A1 | 10/2014 | Van der Meijden et al. | |
| 2015/0286194 A1 * | 10/2015 | Michelon | E04H 4/1654 700/275 |

FOREIGN PATENT DOCUMENTS

| | | |
|---|---|---|
| DE | 10-2007/053311 | 12/2008 |
| EP | 1122382 | 8/2001 |
| EP | 1302611 | 4/2003 |
| EP | 2829937 | 1/2015 |
| EP | 2908205 | 8/2015 |

OTHER PUBLICATIONS

International Search Report of EP Application No. 17 18 1658 dated Jan. 16, 2018.

* cited by examiner

*Primary Examiner* — Shay Karls
(74) *Attorney, Agent, or Firm* — Pearl Cohen Zedek Latzer Baratz LLP

(57) ABSTRACT

A robotic pool cleaner includes a housing, a propulsion mechanism configured to propel the robotic pool cleaner along an interior surface of a pool, and a suction mechanism for drawing liquid from the pool into the housing. A transceiver is configured to receive a signal that is indicative of a relative location of another robotic pool cleaner. A controller is configured to control the propulsion mechanism in accordance with the indicated location of the other robotic pool cleaner.

7 Claims, 4 Drawing Sheets

CONCURRENT OPERATION OF MULTIPLE ROBOTIC POOL CLEANERS

FIELD OF THE INVENTION

The present invention relates to robotic pool cleaners. More particularly, the present invention relates to concurrent operation of multiple robotic pool cleaners.

BACKGROUND OF THE INVENTION

Robotic pool cleaners have been found to provide a practical solution for cleaning swimming pools and other types of tanks and pools. Such robotic pool cleaners typically are configured to self propel across a surface (wall or floor) of the pool. A propulsion mechanism typically includes an electrically powered motor. The motor may also power a suction mechanism that draws water and any suspended debris into an internal trap.

Typically, electrical power for operating the motor of the robotic pool cleaner is provided by a power supply that is located at a safe distance from the edge of the pool. The power supply is connected to the robotic pool cleaner by a cable. Therefore, the cable must be long enough to enable the robotic pool cleaner to reach all parts of the pool. In some cases, the robotic pool cleaner may include a battery (e.g., a storage battery) that has sufficient capacity to enable the robotic pool cleaner to operate without being connected by cable to an external power supply.

As the size of a pool to be cleaned increases, the size and capabilities of the robotic pool cleaner must increase accordingly if the robotic pool cleaner is to function efficiently. For example, the length of the cable must be long enough to reach all parts of the larger pool. The size of the trap for holding dirt and debris should be large enough to hold all of the dirt and debris that may be expected to be removed from a large pool. Therefore, the size of the robotic pool cleaner, and the propulsion system for propelling it, may be increased accordingly.

SUMMARY OF THE INVENTION

There is thus provided, in accordance with an embodiment of the present invention, a robotic pool cleaner including: a housing; a propulsion mechanism configured to propel the robotic pool cleaner along an interior surface of a pool; a suction mechanism for drawing liquid from the pool into the housing; a transceiver configured to receive a signal that is indicative of a relative location of another robotic pool cleaner; and a controller that is configured to control the propulsion mechanism in accordance with the indicated location of the other robotic pool cleaner.

Furthermore, in accordance with an embodiment of the present invention, the transceiver is further configured to transmit a signal that is receivable by a transceiver of the other robotic pool cleaner.

Furthermore, in accordance with an embodiment of the present invention, the signal includes a signal selected from a group of signal types consisting of optical, acoustic and electromagnetic.

Furthermore, in accordance with an embodiment of the present invention, the transceiver includes at least one wire loop antenna.

Furthermore, in accordance with an embodiment of the present invention, the at least one wire loop antenna includes two wire loop antennas on different sides of the robotic pool cleaner, and wherein each of the two wire loop antennas is configured to generate an electromagnetic field whose polarity is opposite the electromagnetic field that is generated by the other wire loop antenna.

Furthermore, in accordance with an embodiment of the present invention, the signal includes a pulsed signal.

Furthermore, in accordance with an embodiment of the present invention, the controller is configured to control the propulsion mechanism to change a direction or speed of motion of that robotic pool cleaner when the received signal is indicative of proximity of the other robotic pool cleaner.

There is further provided, in accordance with an embodiment of the present invention, a robotic pool cleaner including: a housing; a propulsion mechanism configured to propel the robotic pool cleaner along an interior surface of a pool; a suction mechanism for drawing liquid from the pool into the housing; an antenna configured to receive a signal when raised to a waterline of the pool; and a controller configured to: control the propulsion mechanism to move the robotic pool cleaner to the waterline such that the antenna is at the waterline; receive via the antenna a signal that is indicative of a position of the robotic pool cleaner; control the propulsion mechanism to cause the robotic pool cleaner to remain at the waterline until reception of the signal is complete; and control the propulsion mechanism to cause the robotic pool cleaner to re-submerge.

Furthermore, in accordance with an embodiment of the present invention, the signal includes a navigation signal.

Furthermore, in accordance with an embodiment of the present invention, the navigation signal is generated by a satellite navigation system.

Furthermore, in accordance with an embodiment of the present invention, the controller is configured to operate the control the propulsion mechanism to cause that robotic pool cleaner to remain at the waterline until a position of that robotic pool cleaner is identified.

Furthermore, in accordance with an embodiment of the present invention, the controller is configured to control the propulsion mechanism to propel the robotic pool cleaner in accordance with a proximity of another robotic pool cleaner that is indicated by the signal.

Furthermore, in accordance with an embodiment of the present invention, the signal is a signal that is transmitted by the other robotic pool cleaner.

Furthermore, in accordance with an embodiment of the present invention, the controller is configured to transmit via the antenna a signal that is receivable by the other robotic pool cleaner.

Furthermore, in accordance with an embodiment of the present invention, the antenna is located in a handle of the robotic pool cleaner.

Furthermore, in accordance with an embodiment of the present invention, the robotic pool cleaner is configured to operate in a predefined region of the pool, the predefined region being delimited by a region boundary, and wherein the controller is configured to control the propulsion mechanism to propel the robotic pool cleaner in accordance with a proximity of the robotic pool cleaner to the region boundary.

Furthermore, in accordance with an embodiment of the present invention, the controller is configured to alter a direction or speed of motion of the robotic pool cleaner in accordance with the indicated position.

There is further provided, in accordance with an embodiment of the present invention, a system for cleaning a pool, the system including a plurality of robotic pool cleaners, each robotic pool cleaner of the plurality of robotic pool cleaners including: a housing; a propulsion mechanism configured to propel the each robotic pool cleaner along an interior surface of a pool; a suction mechanism for drawing liquid from the pool into the housing; a transceiver configured to receive a signal that is indicative of a relative location of another robotic pool cleaner of the plurality of robotic pool cleaners; and a controller that is configured to control the propulsion mechanism in accordance with the indicated location of the another robotic pool cleaner.

Furthermore, in accordance with an embodiment of the present invention, the transceiver of each robotic pool cleaner is further configured to receive a signal that is transmitted by a beacon and that is indicative of a relative location of the beacon.

Furthermore, in accordance with an embodiment of the present invention, the controller is configured to control the propulsion mechanism in accordance with the indicated location of the beacon.

There is further provided, in accordance with an embodiment of the present invention, a method for automatically controlling operation of a robotic pool cleaner, the robotic pool cleaner including a the method including a housing and a suction mechanism for drawing liquid from a pool into the housing, the method including: controlling, by a controller, operation of a propulsion mechanism of the robotic pool cleaner to move the robotic pool cleaner along an internal surface of the pool to a waterline of the pool so that an antenna of the robotic pool cleaner is raised to the waterline; when the antenna is at the waterline, receiving via the antenna a signal that is indicative of a position of the robotic pool cleaner; controlling the propulsion mechanism to cause the robotic pool cleaner to remain at the waterline until reception of the signal is complete; and controlling the propulsion mechanism to cause the robotic pool cleaner to re-submerge.

Furthermore, in accordance with an embodiment of the present invention, controlling the propulsion mechanism in accordance the indicated position includes controlling the propulsion mechanism in accordance with an indicated proximity of another robotic pool cleaner or in accordance with an indicated proximity of boundary that bounds a predefined region in which the robotic pool cleaner is configured to operate.

Furthermore, in accordance with an embodiment of the present invention, controlling the propulsion mechanism in accordance the indicated position includes altering a direction or speed of motion of the robotic pool cleaner.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
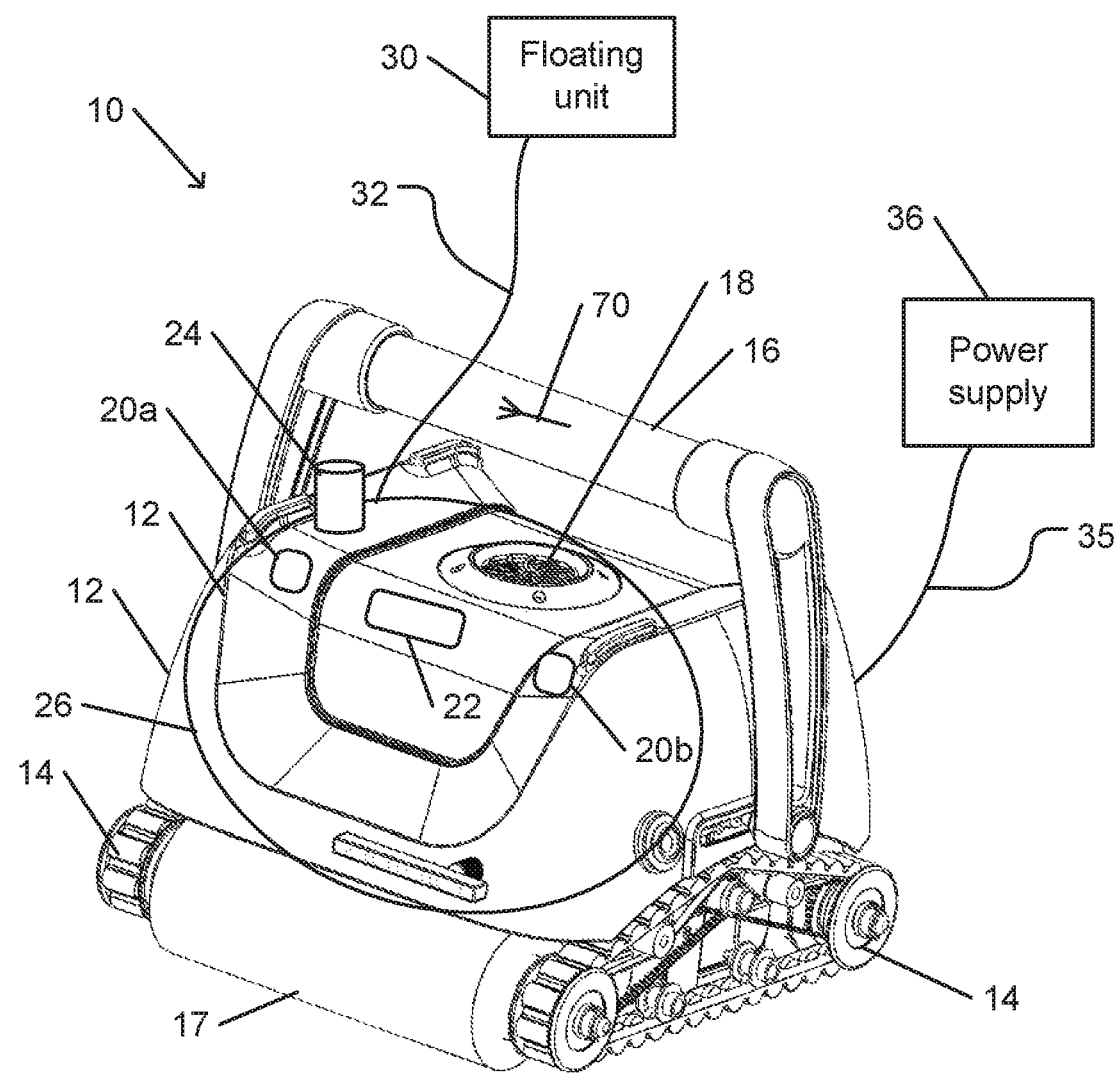
FIG. 1 schematically illustrates a robotic pool cleaner configured for concurrent operation with other similarly configured robotic pool cleaners, in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, hardware circuitry, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In accordance with an embodiment of the present invention, a robotic pool cleaner is configured to operate in a single pool concurrently with one or more additional robotic pool cleaners. As used herein, a pool may refer to a swimming pool, a wading pool, a fish tank, a decorative pool, an artificial pond, or another liquid-filled pool, tank, or container that may be cleaned by a robotic cleaner. It should be understood that, although reference is made herein to water that fills or that is present in the pool, or to a waterline or water surface, the discussion is relevant to any other liquid that fills the pool, or to a surface of that liquid.

The robotic pool cleaners that are operating concurrently are configured to cooperate with one another such that each robotic pool cleaner avoids interfering with operation of other robotic pool cleaners that are operating in the same pool. For example, each of the robotic pool cleaners may be of a size that is suitable for to clean a small pool (e.g., of a size typical of a residential pool) by itself. Concurrent operation of a plurality of such small robotic pool cleaners may enable the small robotic pool cleaners to effectively clean a large pool (e.g., of a size that is typical for a community or organizational pool).

In order to enable each robotic pool cleaner to avoid interfering with the operation of other robotic pool cleaners in the same pool, the robotic pool cleaners are configured to communicate with one another. The communication may take place when the robotic pool cleaners are submerged (e.g., via sound or ultrasound, or optical), or may be limited to when part of each robotic pool cleaner extends above the water surface (e.g., by radio or microwaves). The communication may be direct from one robotic pool cleaner to another, or may be accomplished by communication of two or more robotic pool cleaners with a common device.

For example, each of the plurality of robotic pool cleaners may be configured to operate in a limited portion of the pool. For example, each robotic pool cleaner may be connected to a different power supply, each power supply being located at a different part of the pool. The intercommunication among the different robotic pool cleaners may enable the robotic pool cleaners to operate concurrently in a single pool such that is no mutual interference or collision between them. Alternatively or in addition, each robotic pool cleaner may be provided with navigational sensors or devices to identify its position. Alternatively or in addition, the pool, power supply, or another device may be configured with sensors to determine the position of each robotic pool cleaner that is operating within the pool. For example, one or more acoustic or optical sensors may be configured to track the motion of each robotic pool cleaner (e.g., each robotic pool cleaner may be provided with an acoustic or optical tag to enable unique identification of each individual robotic pool cleaner).

Use of a plurality of coordinated robotic pool cleaners to clean a single pool, where the approach of two or more robotic pool cleaners is restricted, may be advantageous. A single small robotic pool cleaner (e.g., with a cable that is about 12 meters to 30 meters long) would typically be well suited for cleaning a small pool (e.g., a swimming pool that is associated with a single residence or with a small complex of residences). For larger pools (e.g., a swimming pool that is operated by a municipality, school, institution, sport center, or other swimming pool that is configured to accommodate a large number of concurrent users), a larger robotic pool cleaner with a longer cable, and equipped with a larger filter and debris container, would be typically used. Such larger cleaners are typically heavy, unwieldy, and expensive. Furthermore, a single large robotic pool cleaner would typically have to operate for a longer period of time than would two or more smaller robotic pool cleaners that are operating concurrently in a single pool.

Furthermore, many public facilities operate two or more pools of different sizes. For example, a facility may include a large pool for older, more experienced, or more serious swimmers, and a smaller shallow wading pool for younger children. A large robotic pool cleaner designed for the large pool could be unsuitable (e.g., may be too long or tall) to clean the shallow wading pool (e.g., the size of the large robotic pool cleaner could be such that the intake could not clean the wall of the shallow wading pool). Therefore, use of multiple coordinated robotic pool cleaners to clean a single large pool of such a facility may be advantageous in that one or more of the robotic pool cleaners may be used also to clean smaller pools. Use in a single pool of multiple robotic pool cleaners whose movements are not coordinated could result in one or more cables becoming tangled with another robotic pool cleaner or with another cable.

Each robotic pool cleaners includes one or more electrically powered motors for enabling self propulsion of the robotic pool cleaner. For example, a motor may be coupled via a transmission assembly or otherwise to one or more wheels, tracks, propellers, fins, jets, or other propulsion mechanisms. For example, a mechanical transmission may include one or more gears, pulleys, belts, wheels, rollers, or another component that may be utilized in a transmission for transmitting torque from a motor to a propulsion mechanism. The propulsion mechanism is configured to enable the robotic pool cleaner to self-propel along an interior surface of the pool (e.g., wall or floor, or other solid surface that is in contact with the liquid that is contained in the pool). Alternatively or in addition, a propulsion mechanism may be hydraulically powered. For example, the robotic pool cleaner may be powered by a stream of pressurized liquid (e.g., to turn a turbine that is coupled to the propulsion mechanism) that is provided by a poolside pump or other pressure source.

One or more electrically powered motors or pumps may be configured to operate a suction mechanism for cleaning an interior pool surface along which the robotic pool cleaner is traveling. For example, a motor may be coupled to one or more pumps, propellers, turbines, screws, or other mechanisms that are configured to draw liquid from the pool into an intake port and expel the liquid back into the pool via an outflow port. The liquid is forced to flow through one or more meshes, grates, screens, filters, or other filtering structure between the intake port and the outflow port. The filtering structure is configured to trap any dirt or debris that is suspended in the liquid. The trapped dirt or debris may be retained in a container until removed by an operator of the robotic pool cleaner, such as pool maintenance personnel. The volume of the container may be selected so as to have sufficient capacity to hold a quantity of dirt or debris that may reasonably be expected to be trapped during typical (e.g., daily, weekly, or other periodic) operation of the robotic pool cleaner.

A power supply is required to supply electrical power for operation of the robotic pool cleaner. For example, electrical power may be required for operation of one or more of a motor or pump, a sensor, a controller or processor, an illumination system, a communication system, a navigation system, or other systems or components of the robotic pool cleaner. A power supply for providing electric power to the robotic pool cleaner may be self contained in the form of a storage battery or other replaceable battery. Alternatively or in addition, the power supply may be located externally to the robotic pool cleaner. When external to the robotic pool cleaner, the robotic pool cleaner may be connected to the power supply via a power cable. For example, a power cable may have a length in the range of about 12 meters to 30 meters, or another length. The length may be selected to be sufficient to enable the robotic pool cleaner to reach all parts of the pool that the robotic pool cleaner is expected to clean (e.g., all interior surfaces of a small pool, or a part of a large pool). The power cable may be configured to have a density that is lower than the density of liquid in the pool. For example, a casing of the cable may include a porous material or other low density material. In this manner, most of the cable (except for a segment that is adjacent to the robotic pool cleaner, or that lies outside of the pool) may be expected to float at the surface of the liquid in the pool.

The length of a power cable may be selected also to be sufficient to connect to a power supply that is located sufficiently distant from the pool to satisfy any safety or legal requirements. For example, the power supply may be sufficiently distant from the pool to prevent the power supply from falling into the pool, from being touched by a person who is in contact with water in the pool, from being splashed by water from the pool, or from otherwise presenting a potential hazard to people, animals, or equipment.

In accordance with an embodiment of the present invention, a system for robotic cleaning of a pool includes at least two robotic pool cleaners. Each robotic pool cleaner may be configured to detect either the proximity of another robotic pool cleaner, or to detect its own position. A controller of the robotic pool cleaner may control locomotion of the robotic pool cleaner so as to avoid interference with the operation of other robotic pool cleaners. For example, the controller may be integrated within a housing of the robotic pool cleaner, may be integrated into an external power supply, or may be located elsewhere.

The robotic pool cleaner may include one or more sensors. Some or all of the sensors may be located on the robotic pool cleaner, or may be located externally to the robotic pool cleaner. The sensors may include navigation-related sensors for sensing a current position, orientation, or motion of the robotic pool cleaner. For example, navigation-related sensors may include orientation sensors (e.g., an accelerometer, tilt sensor, or other sensor for measuring a tilt angle), angular rate sensors (e.g., a gyroscope), electronic compasses, proximity sensors (e.g., to detect proximity to a vertical or other surface, to an obstruction, to another robotic pool cleaner, or to another object), depth sensors, or other sensors that may sense a quantity related to a current positions of the robotic pool cleaner, or a position relative to another object. Proximity sensors may include infrared or visible-light optical sensors, magnetic sensors, inductive sensors, capacitive sensors, ultrasonic rangefinders, or laser rangefinders. In some cases, navigation sensors may include a receiver for receiving navigation signals from a global or local navigation system, as from the Global Positioning System (GPS).

Each robotic pool cleaner may incorporate a transceiver for transmitting signals that are receivable by other robotic pool cleaners that are operating in a pool, and for receiving signals that are transmitted by the other robotic pool cleaners. As used herein, a transceiver may refer to a single unit that is configured to both transmit and receive a signal, or to separate (and, possibly, spatially separated) units that are each configured to either transmit the signal or to receive the signal.

For example, the transceiver may be configured to transmit a position signal that is indicative of a position of the robotic pool cleaner within the pool. The position may be determined relative to one or more features or landmarks that may be identified by all of the robotic pool cleaners that operate in a single pool (or in a pool complex that includes more than one pool). Such features may include a vertical surface, fixed reference marker, or an object that moves within the pool (e.g., one of the robotic pool cleaners). The transceiver may also be configured to receive a position signal or other signal that is transmitted by another robotic pool cleaner. For example, the transceiver may include a single transceiver unit that is incorporated into or attached to the robotic pool cleaner. The transceiver may include two or more separate units, such as separate transmitter and receiver units.

The signal that is transmittable or receivable by the transceiver may include a continuous or pulsed acoustic signal (e.g., ultrasonic, audible, or infrasonic frequencies), optical signal (e.g., visible, infrared, or ultraviolet radiation), electromagnetic signal (e.g., a radiofrequency signal), or another suitable signal.

A transmitter of an acoustic transceiver may include a piezoelectric or other type of sound or ultrasound transmitter. The receiver may include an appropriate acoustic sensor (e.g., microphone, hydrophone, diaphragm, or other detector) that is configured to detect an incident sound or ultrasound pulse or wave. For example, an ultrasonic transceiver may be configured to emit an ultrasound signal in the form of a pulse at a specific frequency (e.g., in the frequency range of about 20 kHz to about 200 kHz), and to detect the echo of the transmitted signal that is reflected by an object (e.g., a surface of a stationary or moving object). The transceiver, or a processor that is associated with the transceiver, may calculate a distance from the robotic pool cleaner to the object by measuring a time delay between transmission of the signal and reception of the reflected echo, or on the basis of an amplitude or intensity of the received reflected signal.

An optical transceiver may comprise an optical transmitter in the form of laser, light emitting diode (LED), or other light source that is configured to produce a beam or pulse of light at a selected wavelength. An optical receiver may include an optical sensor such as a photodiode, charge-coupled device (CCD), complementary metal-oxide-semiconductor (CMOS) sensor, bolometer, or another type of optical sensor. The optical receiver may be configured (e.g., by a filter or by using a material that sensitive only to optical radiation in a limited wavelength range) to respond to a specific wavelength of optical radiation. An optical receiver, or a processor that is associated with the optical receiver, may be configured to respond only to pulses of light at a selected pulse frequency.

An electromagnetic transceiver may include an electromagnetic transmitter and receiver, such as an appropriate antenna and circuitry (e.g., a wire loop antenna for near-field detection). For example, the circuitry may enable tuning the transmitter and sensor to a particular frequency or frequency band.

A robotic pool cleaner may include a plurality of transceivers. For example, each of the plurality of transceivers may be configured to determine a relative position of the robotic pool cleaner in each of one or more directions (e.g., each transceiver may be configured to operate along a separate axis). Alternatively or in addition, a single transceiver may be mounted on a rotating or swiveling mount so as to enable the single transceiver to successively determine its position in different directions.

For example, each robotic pool cleaner may include two optical sources or transmitters located on opposite lateral sides of the robotic pool cleaner. (As used herein, the term "longitudinal" refers to the forward-backward direction of typical movement of the robotic pool cleaner, and "lateral" refers to the right-left direction approximately perpendicular to the longitudinal direction.) Each of the optical transmitters may be configured to emit optical radiation with characteristic angular distribution. Each of the two optical transmitters may be aimed along a common axis. For example, the two optical transmitters may be aimed in the forward direction or along another central axis.

Each robotic pool cleaner may additionally include an optical sensor that is located near a central longitudinal midline of the robotic pool cleaner and that is aimed forward, facing the direction of travel. The sensor may have a wide (e.g., approximately hemispherical) or a limited field of view.

Each of the two optical transmitters on each robotic pool cleaner may be configured to alternately flash with a common period. The timing or synchronization of the flashing of the two optical transmitters may be configured to alternate such that at any given time, only one of the two optical transmitters is emitting a flash.

In this configuration, (e.g., when the optical transmitters are configured to emit in the forward direction) one robotic pool cleaner may detect the proximity and relative orientation of another similarly configured robotic pool cleaner. For example, when both robotic pool cleaners are positioned directly opposite and directly facing one another (e.g., traveling on a course toward a head-on collision), the optical sensor of each robotic pool cleaner may detect the flashes that are emitted by both optical transmitters of the other with equal intensity. In the case where the duration of each emitted flash is substantially equal to half the period between flashes, the detected optical radiation may be substantially constant. When one of the robotic pool cleaners is rotated relative to the other, the intensities of the signals that are detected from the two optical transmitters may differ from one another, depending on the angular distribution of the emitted radiation (and on the angular sensitivity of the optical receiver). Thus, a duty cycle of the detected optical radiation may be indicative of the angle of rotation of one robotic pool cleaner relative to the other. In the case that the signals that are emitted by the right and left optical transmitters differ from one another (e.g., flashes of different durations), the direction of the rotation may be determined from the detected optical radiation. Once the angle of rotation is known, a value of the intensity (e.g., maximum intensity) of the detected optical radiation may be indicative of the distance between the two robotic pool cleaners.

As another example, each robotic pool cleaner may be configured with acoustic transceivers. For example, an acoustic transmitter of each robotic pool cleaner may be configured to emit a sound or ultrasound signal that is characterized by a particular frequency, e.g., of transmitted pulses. Circuitry or a processor associated with an acoustic receiver of each acoustic transceiver may be configured to identify the frequency of a received acoustic. A shift in frequency between the transmitted and detected acoustic signals may be interpreted as a velocity-related Doppler shift. If the frequency of the detected acoustic signal is greater than the frequency of the transmitted signal, two robotic pool cleaners may determine that they are approaching one another. If the frequency of the detected acoustic signal is lower than the frequency of the transmitted signal, two robotic pool cleaners may determine that they are traveling away from one another. Analysis of the amount of the shift may enable calculation of the speed with which the two robotic pool cleaners are approaching one another or traveling away from one another.

Each of the robotic pool cleaners may be configured to transmit an acoustic signal that is distinguishable from the acoustic signals that are transmitted by other robotic pool cleaners (or at least by other robotic pool cleaners that are operating in the same pool). For example, each robotic pool cleaner may be individually configured to transmit ultrasonic signals that are characterized by a unique frequency, pulse duration, duty cycle, or other unique characteristic. In this case, each robotic pool cleaner may be configured to determine if a received acoustic signal received is an echo of its own transmission, or is an acoustic signal that was transmitted by another robotic pool cleaner. For example, an operator of a plurality of robotic pool cleaners may configure each robotic pool cleaner with unique identification characteristics, e.g., prior to operation of each robotic pool cleaner.

As another example, each robotic pool cleaner may be provided with one or more wire loop antennas for creating an electromagnetic field. For example, the wire loop antenna may be mounted on a housing of the robotic pool cleaner. An electric current that flows through the loop may generate a magnetic field that may be sensed by a magnetometer that is incorporated in each robotic pool cleaner. For example, the operation of the magnetometer may be based on the Hall Effect, magnetoresistance, or on another principle of operation.

The current in the wire loop antenna may be pulsed to create a short duration electromagnetic field. The magnetometer of each robotic pool cleaner may be configured to detect an electromagnetic field only when current is not flowing through its own wire loop antenna. Thus, the magnetometer may be configured to only detect electromagnetic fields that are generated by other robotic pool cleaners. In order to ensure that different robotic pool cleaners do not generate pulses at the same time (and thus prevent each robotic pool cleaner from detecting pulses that are generated by other robotic pool cleaners), the period of creating the pulses may be continually varied (e.g., in a random manner).

In some cases, each robotic pool cleaner may be provided with two separate wire loop antennas, e.g., one on its front and one on its rear. Current may be configured to flow in opposite directions through each of the two separate wire loop antennas. Thus, the electromagnetic field that is generated by current flowing through the two different wire loop antennas may have opposite polarities. Therefore, each robotic pool cleaner may be configured to determine an orientation of another robotic pool cleaner in accordance with a polarity of a detected electromagnetic field. Repeated measurements of changes in the amplitude or strength of the detected electromagnetic field may indicate a relative direction of motion between two robotic pool cleaners. For example, two robotic pool cleaners are approaching each other may be indicated by an increase of field strength. Two robotic pool cleaners traveling away from one another may be indicated by a decrease in detected field strength. Alternatively or in addition, the direction of the current through each loop may be reversible and controlled to indicate a direction of motion of the robotic pool cleaner.

Each robotic pool cleaner may be provided with a rigid or semi-rigid external housing that is configured to extend above the surface of the water in the pool. The external housing may be configured to be in electrical communication with a controller of the robotic pool cleaner. Such an external housing may be connected to a housing of the robotic pool cleaner by a plastic or stainless steel mast. The external housing may be connected by a flexible or semi-flexible cable. The external housing may include a floatation device or may otherwise be sufficiently buoyant so as to remain on the surface of the water.

The external housing may contain a transceiver or receiver configured to determine the position of the robotic pool cleaner. The determined position may include a position in global coordinates (e.g., latitude and longitude, or another global or regional coordinate system), relative to a fixed reference (e.g., one or more stationary power supply or other set of stationary objects or landmarks), relative to other floating external housings of other robotic pool cleaners, or otherwise.

For example, the external housing may house a GPS receiver configured to obtain absolute position coordinates.

The external housing may include a transmitter to transmit the GPS coordinates to the controller of the robotic pool cleaner. Alternatively or in addition, the floating housing may house one or more optical or acoustic rangefinders to measure a distance or a position of the external housing relative to one or more fixed optical or ultrasonic beacons (e.g., located outside of the pool). Alternatively or in addition, the external housing may house one or more optical, acoustic, or radio orientation sensors or rangefinders to determine a position of the external housing relative to external housings of other similarly configured robotic pool cleaners operating in one pool.

A transceiver in an external housing may be configured to transmit a coded signal upon receipt of an interrogation command from another robotic pool cleaner. For example, the coded signal may encode information related to the amplitude of a transmitted or received signal, or to relative amplitudes of signals that are received from other similarly configured robotic pool cleaners, from fixed transceivers, or from other sources.

A transceiver of a robotic pool cleaner may be configured to operate in accordance with a set of communication parameters that are selected for that robotic pool cleaner. For example, a list of possible parameter values may be stored on a data storage device, such as a programmed microcontroller for controlling the transceiver. A different set of parameters may be selected for each robotic pool cleaner of a group of robotic pool cleaners that are to operate in a single pool. Selecting different parameters may ensure that signals that are transmitted by a transceiver of a robotic pool cleaner are distinguishable from signals that are transmitted by the other robotic pool cleaners. Thus, interference or confusion between the signals that are transmitted by the different robotic pool cleaners may be prevented. The parameters may be selected by transmitting commands from an external device. For example, the external device may include, or may be incorporated into, a power supply to which the robotic pool cleaner is connected.

Alternatively or in addition, one of the robotic pool cleaners may be configured to operate as a master pool cleaner. The master pool cleaner may be configured to transmit a synchronization signal to other robotic pool cleaners that are operating in the same pool as slave pool cleaners. The synchronization signal may cause each of the slave pool cleaners to transmit data or otherwise during a predetermined unique time interval or slot.

Alternatively or in addition, a slave pool cleaner may be configured to receive signals only. For example, a master pool cleaner may receive a navigation signal and transmit its position. A slave pool cleaner may then be configured to receive a navigation signal and the position signal that is transmitted by the master pool cleaner. The slave pool cleaner may be configured to control its motion in accordance with the received navigation and master position signals.

A GPS receiver may be mounted within a part of the robotic pool cleaner that occasionally extends above the water surface during operation of the robotic pool cleaner. For example, the part may be extended above the water surface when the robotic pool cleaner climbs a wall of the pool to the waterline.

A robotic pool cleaner may be configured to create sufficient suction to enable the robotic pool cleaner to adhere to the pool wall when submerged. However, the suction may not be sufficient to hold the robotic pool cleaner to the wall after part of the robotic pool cleaner has moved above the waterline. Thus, the robotic pool cleaner may be configured to stop upward vertical motion when the water inlet of the robotic pool cleaner reaches the waterline. A handle or other part of the housing of the robotic pool cleaner that projects outward may be made buoyant. Therefore, the projecting part may act as a float or stabilizer to maintain the orientation of the robotic pool cleaner at the wall. The position may be maintained until a controller of the robotic pool cleaner detects that the intake is above the waterline (e.g., detected by detecting a reduced load on the motor of the suction pump due to intake of air instead of water, resulting in reduced current in the motor), and a drive motor (or transmission) is operated to reverse the direction of travel of the robotic pool cleaner to re-submerge.

When the robotic pool cleaner reaches the waterline (e.g., as indicated by detection of reduced pump motor current or otherwise), the controller may operate a GPS receiving antenna that is located inside the handle to receive GPS signals. The controller may be configured to hold the robotic pool cleaner position at the waterline until a GPS signal is received and interpreted. For example, receiving and interpreting a GPS signal may require between 10 seconds and 30 seconds. In some cases, the robotic pool cleaner may be configured to reverse its direction to re-submerge if a GPS signal is not interpreted within a predetermined time limit.

The received GPS signal may be interpreted to acquire a position of the robotic pool cleaner each when the GPS receiver of the robotic pool cleaner extends above the waterline. The position may be stored in a data storage unit of the controller. The acquired position may be compared with one or more previously acquired and recorded positions of the robotic pool cleaner (e.g., previous times when the robotic pool cleaner climbed the pool wall to the waterline). Comparison of such a plurality of acquired position measurements may be utilized by the controller to create a map of the pool walls. For example, a maximum distance between acquired positions may be interpreted to provide an indication of the size of the pool. Comparison of two sequential GPS measurements may provide information on the accuracy of the robotic pool cleaner's movement (e.g., to compare an actual speed of movement with an expected, e.g., planned or designed, speed of movement).

The acquired position of each robotic pool cleaner may be shared with other robotic pool cleaners that are operating in a single pool. Each of the robotic pool cleaners may use the shared positions to coordinate its movement with positions and movement of the other robotic pool cleaners.

For example, the robotic pool cleaner may include a radio or microwave transceiver with an antenna that is located in a part of the robotic pool cleaner that is configured to extend above the surface of the water in the pool when the robotic pool cleaner climbs a wall of the pool to the waterline. The transceiver may transmit position information, e.g., as obtained from a GPS receiver, a stationary or movable external transceiver that is located outside of the pool, e.g., in a power supply of the robotic pool cleaner or elsewhere. A unique identifier of the robotic pool cleaner may be transmitted together with the position information. The external transceiver may then transmit the identifiers and most recent positions of any other robotic pool cleaners that are operating concurrently in the pool.

Alternatively or in addition, each robotic pool cleaner, upon acquiring its position, may remain at the waterline on a wall of the pool until at least one other robotic pool cleaner reaches the waterline. When two or more robotic pool cleaners are located at the waterline, they may wirelessly communicate with one another via antennas that extend above the waterline. Thus, the robotic pool cleaners may share their positions with one another.

Two or more robotic pool cleaners may be placed at different locations of a single pool to operate concurrently. Shared position information may be utilized by the controllers of each of the robotic pool cleaners so as to avoid interfering with the operation of the other robotic pool cleaners.

For example, each robotic pool cleaner may be configured (by its autonomous navigation program) to attempt to reach and clean the entire surface of the pool. Each robotic pool cleaner may be further configured to change its direction motion when the proximity of another robotic pool cleaner is detected (e.g., via operation of acoustic, optical, or electromagnetic transmitters and sensors). For example, each robotic pool cleaner may be configured to turn in a specific direction (e.g., by a particular angle, e.g., 90°, in a particular direction, e.g., to the right or to the left), to reverse direction, to executed combination of such movements, or execute another predetermined movement, when proximity to another robotic pool cleaner is detected. In this manner, the two robotic pool cleaners may avoid collision with one another. When the robotic pool cleaners are connected to their power supplies by cables, the robotic pool cleaners may avoid passing one another, thus avoiding the risk of entangling one of the robotic pool cleaners or its cable with a cable of the other robotic pool cleaner. (In the case that the robotic pool cleaners are each powered by a battery that is carried by the robotic pool cleaner, or when no other cables or tethers are attached to the robotic pool cleaner, avoidance of entanglement need not be considered.)

Mutual avoidance by two or more robotic pool cleaners may ensure that one robotic pool cleaner does not redundantly clean a region of the pool that had already been cleaned by another robotic pool cleaner. When only a single robotic pool cleaner is operating in the pool, that robotic pool cleaner may cover the entire surface without requiring any alteration to its programmed instructions.

Alternatively or in addition, e.g., in the case that each robotic pool cleaner is configured to detect its position, e.g., relative to a fixed coordinate system or beacon, each robotic pool cleaner may be configured to operate within a predetermined region relative to the coordinate system or beacon. For example, one robotic pool cleaner may be configured to change direction or reverse its motion when reaching a predetermined distance from a fixed beacon while receding from the beacon. Another robotic pool cleaner that is operating in the same pool may be configured to similarly change direction or reverse its motion when reaching a predetermined distance from the beacon while approaching the beacon. As another example, each robotic pool cleaner may be configured to turn or reverse direction upon reaching a border of a region of operation that is defined in terms of a coordinate system. As another example, each robotic pool cleaner may be configured to change its motion upon approaching within a predetermined threshold distance of the beacon (e.g., an underwater optical, ultrasonic, or radiofrequency transmitter, e.g., of a robotic pool cleaner that is programmed to remain stationary, or of another beacon).

Figure 2:
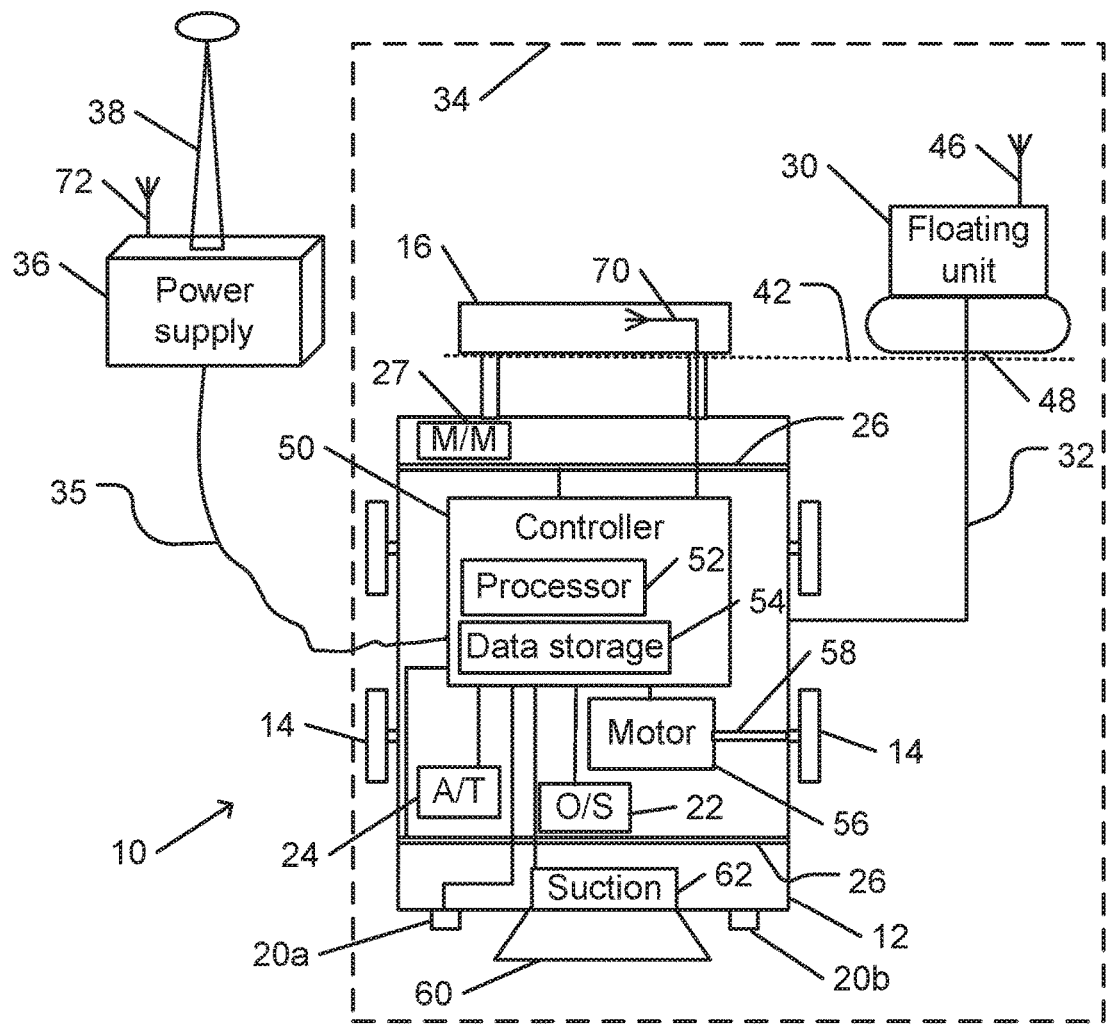
FIG. 2 is a schematically illustrates components of the robotic pool cleaner shown in FIG. 1.

FIG. 1 schematically illustrates a robotic pool cleaner configured for concurrent operation with other similarly configured robotic pool cleaners, in accordance with an embodiment of the present invention. FIG. 2 is a schematically illustrates components of the robotic pool cleaner shown in FIG. 1.

Robotic pool cleaner 10 is configured to operate in a pool 34 in coordination with one or more other robotic pool cleaners 10. Robotic pool cleaner 10 includes cleaner body housing 12. Cleaner body housing 12 is configured to enclose a motor 56 for operation of wheels 14 (or another propulsion mechanism) via transmission 58. Cleaner body housing 12 is also configured to enclose suction mechanism 62 (e.g., a pump, propeller, or other suction mechanism, e.g., a propeller at outflow port 18). Suction mechanism 62 is configured to draw liquid from pool 34 into intake 60 and to expel the liquid through outflow port 18. A filter (not shown) between intake 60 and outflow port 18 is configured to trap suspended dirt or debris in the liquid and hold the trapped dirt or debris until removed (e.g., accessible for removal by opening part of cleaner body housing 12). Typically, intake 60 is located on a bottom surface of cleaner body housing 12 (and is not visible in FIG. 1). In some cases, a roller brush 17 or other structure may be configured to facilitate movement of dirt and debris to the bottom of cleaner body housing 12 and to intake 60.

Power for operation of robotic pool cleaner 10 may be provided by power supply 36. For example, power supply 36 may include a storage battery or other power supply (e.g., solar panel) that may be incorporated into robotic pool cleaner 10.

Alternatively or in addition, power supply 36 may be external to robotic pool cleaner 10 (and typically located outside of at a recommended, e.g., safe, distance from pool 34), and connected to robotic pool cleaner 10 by power cable 35. Power supply 36 may be configured to convert a line voltage to a voltage that is safe for operation in a pool 34 where people or animals may be present. Power cable 35 may be sufficiently buoyant to enable at least part of power cable 35 to float on the surface of pool 34. Power cable 35 may be configured (e.g., with a cable or optical fiber that is configured for transmission of data) to enable transmission of data or signals between power supply 36 and robotic pool cleaner 10. A power supply 36 that is external to robotic pool cleaner 10 may be configured to remain stationary (e.g., may be configured to remain at a fixed location on a surface outside of pool 34).

An assembly that includes a power supply 36 that is external to robotic pool cleaner 10 may include other components of a system that includes one or more robotic pool cleaners 10. For example, an assembly that includes power supply 36 may include one or more component processing units, circuits, or data storage units or memories of processor 52 or of data storage device 54, one or more fixed antennas 72 (e.g., for communicating with one or more of one or more robotic pool cleaners 10, with a GPS system, with a remote input device, e.g., to enable an operator to enter programmed instructions, commands, or data to controller 50, or with another device or system), one or more navigation beacons 38 (e.g., optical, electromagnetic, or acoustic), or another component or device.

Handle 16 of robotic pool cleaner 10 may be configured to float. For example, handle 16 may be at least partially hollow or may be primarily constructed of a material that is less dense than liquid in pool 34.

Controller 50 is configured to control operation of components of robotic pool cleaner 10. In particular, controller 50 may be configured to control navigation and locomotion of robotic pool cleaner 10. One, some, or all components of controller 50 (e.g., one or more components of processor 52 or of data storage device 54) may be located external to robotic pool cleaner 10, e.g., in an assembly that includes power supply 36, or elsewhere. For example, an external component of controller 50 may communicate with robotic pool cleaner 10 via power cable 35.

Controller 50 may include a processor 52. Processor 52 may include one or more processing units that are configured to operate in accordance with programmed instructions. Alternatively or in addition, processor 52 may include analog or digital circuitry that is configured to control operation of one or more components of robotic pool cleaner 10 (e.g., motor 56) in response to one or more input signals (e.g., a signal sensed quantity by one or more sensors of robotic pool cleaner 10).

A processing unit of processor 52 may communicate with data storage device 54. For example, processor 52 and data storage device 54 (or their functionality) may be incorporated into a single component (e.g., integrated circuit or circuit board), or may be incorporated into two or more separate components. Data storage device 54 may include one or more volatile or nonvolatile, fixed or removable, data storage units or memory devices. Data storage device 54 may be configured to store programmed instructions for operation of processor 52. Data storage device 54 may be used to store one or more parameters or other data for use by processor 52 during operation. For example, programmed instructions, parameters, or input data may be stored in data storage device 54 during manufacture or preparation for use of robotic pool cleaner 10.

Data storage device 54 may be utilized to store one or more quantities that are sensed or received by one or more sensors or receivers. Data storage device 54 may be utilized to store one or more results of processing during operation of processor 52. In particular, data storage device 54 may be used to store one or more previously identified positions of robotic pool cleaner 10 (e.g., each stored positioned accompanied by a time at which the position was identified).

Robotic pool cleaner 10 may include one or more components that enable identifying a position of robotic pool cleaner 10. The identified position may be relative to one or more stationary or moving devices or coordinate systems. The identified position may be utilized to control motion of two or more robotic pool cleaners 10 that are operating in a pool 34.

Figure 3:
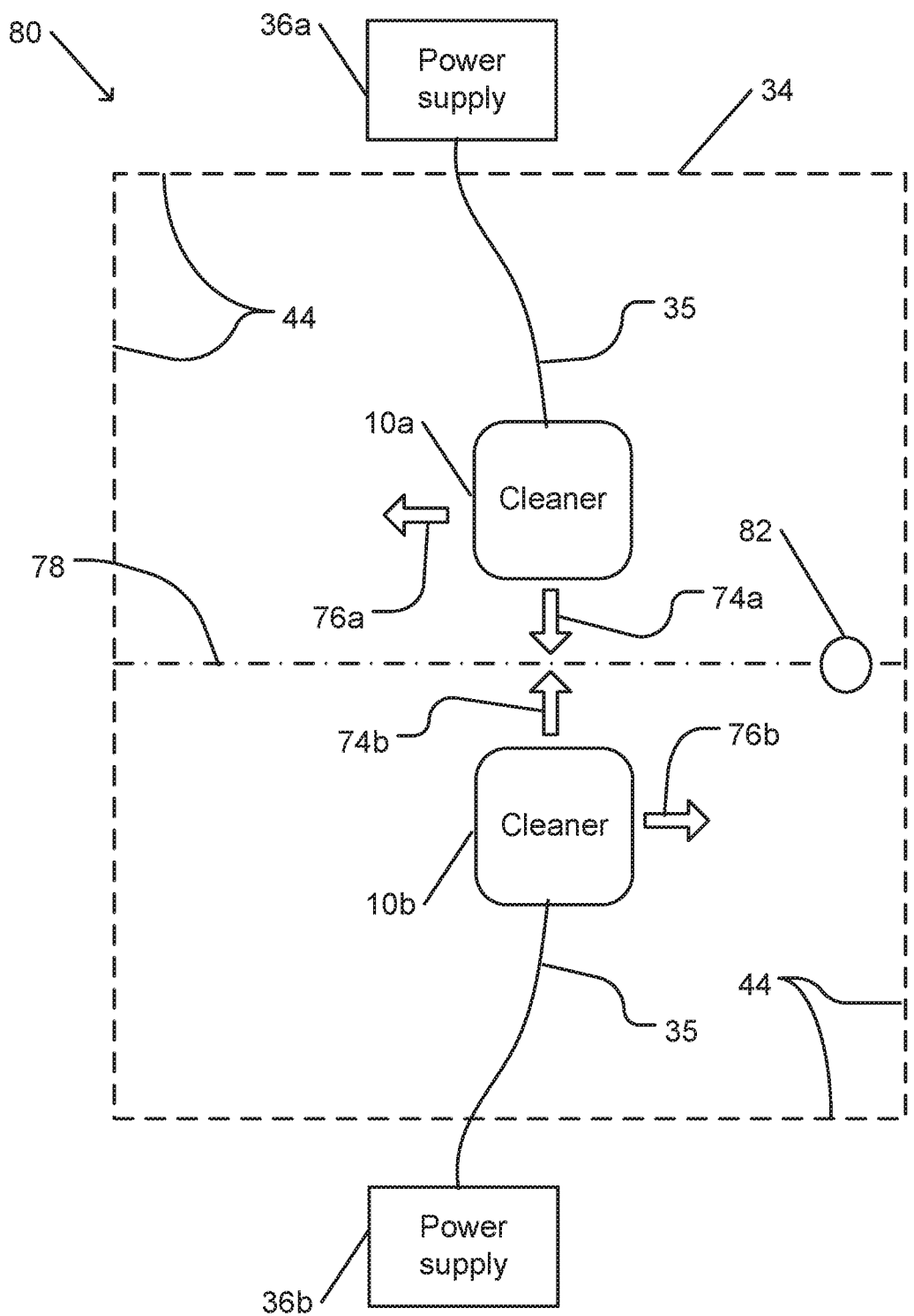
FIG. 3 schematically illustrates a pool cleaning system in which multiple robotic pool cleaners operate concurrently in a pool, in accordance with an embodiment of the present invention.

FIG. 3 schematically illustrates a pool cleaning system in which multiple robotic pool cleaners operate concurrently in a pool, in accordance with an embodiment of the present invention.

Multiple cleaner pool cleaning system 80 may include two or more robotic pool cleaners 10 (e.g., robotic pool cleaner 10a and robotic pool cleaner 10b) that operate in a single pool 34. For example, each robotic pool cleaner 10a or 10b may be connected to a separate power supply 36a or 36b, respectively, via separate power cables 35. Alternatively or in addition, two or more robotic pool cleaners 10 may be connected to a single power supply 36, e.g., via separate power cables 35. Each robotic pool cleaner 10 is provided with one or more sensors or other devices that enable two or more robotic pool cleaners 10 (e.g., robotic pool cleaner 10a and robotic pool cleaner 10b), to detect one another's proximity.

For example, a robotic pool cleaner 10 may include one or more optical source devices 20a and 20b and one or more optical sensors 22. For example, one of optical source devices 20a and 20b may be located on a right side of robotic pool cleaner 10 (e.g., to the right of a longitudinal midline that is parallel to a direction of motion of robotic pool cleaner 10), with the other located on the left side (as shown). Each of optical source devices 20a and 20b may be configured to produce a characteristic optical signal (e.g., a particular pattern of pulses). For example, each optical source device 20a or 20b may include an LED or laser diode that emits optical or infrared radiation. Optical sensor 22 may include a suitable detector for detecting optical radiation that is emitted by optical source devices 20a and 20b. For example, a distance of one robotic pool cleaner 10a from another robotic pool cleaner 10b may be determined by an intensity of an optical signal that is sensed by optical sensor 22. In some cases, e.g., where each of optical source devices 20a and 20b is configured to emit a different pattern of radiation, analysis of the sensed optical signals may enable distinguishing the sensed intensities of the signals that are emitted by each of optical source devices 20a and 20b. In such a case, a relative orientation between robotic pool cleaner 10a and robotic pool cleaner 10b may be calculated based on the relative sensed intensities of the two signals (e.g., where an emission pattern of optical radiation that is emitted by each of optical source devices 20a and 20b is known).

Alternatively or in addition, each robotic pool cleaner 10 may be provided with an acoustic transceiver 24. Acoustic transceiver 24 may be configured to emit and detect an acoustic signal (e.g., in the ultrasonic or audible frequency ranges). For example, a signal that is detected by an acoustic transceiver 24 may include an echo signal of a signal that was emitted by that acoustic transceiver 24, or may be a signal that was emitted by another robotic pool cleaner 10. If each robotic pool cleaner 10 is configured to emit an acoustic signal that is uniquely characterized (e.g., by a frequency or pulse pattern), acoustic signals that are emitted by acoustic transceivers 24 of different robotic pool cleaners 10 may be distinguished from one another. A distance of robotic pool cleaner 10b from robotic pool cleaner 10a may be determined by an intensity of an acoustic signal that was emitted by an acoustic transceiver 24 of robotic pool cleaner 10b and detected by acoustic transceiver 24 of robotic pool cleaner 10a. Alternatively or in addition, the distance may be determined by a time delay between an acoustic signal that is emitted by acoustic transceiver 24 of robotic pool cleaner 10a, and an echo signal from robotic pool cleaner 10b that is detected by acoustic transceiver 24 of robotic pool cleaner 10a Similarly, a position of robotic pool cleaner 10 in pool 34 may be determined by a time of an echo to return from one or more walls 44 or other surfaces of pool 34, or from one or more other landmarks in pool 34.

Alternatively or in addition, robotic pool cleaner 10 may be provided with one or more electromagnetic wire loop antennas 26. For example, one electromagnetic wire loop antenna 26 may be located near a front end of robotic pool cleaner 10, and another may be located near a rear end of robotic pool cleaner 10. Controller 50 may be configured to generate a current that flows through one or more electromagnetic wire loop antennas 26 to create an electromagnetic field. For example, a direction of current flow in each electromagnetic wire loop antenna 26, and thus a polarity of the generated electromagnetic field, may be selected in accordance with a position of each electromagnetic wire loop antenna 26 or a present direction of motion of robotic pool cleaner 10. Each robotic pool cleaner 10 may be provided with one or more magnetometers 27 (or one or more other sensors that are configured to measure a strength of an electromagnetic field) to measure the strength of an electromagnetic field, e.g., that is generated by an electromagnetic wire loop antenna 26 of another robotic pool cleaner 10. A measured strength of the electromagnetic field may be indicative of a distance between two robotic pool cleaners 10.

Thus, one or more of optical sensor 22, acoustic transceiver 24, or magnetometer 27 of a robotic pool cleaner 10, together with corresponding emitters on the same or a different robotic pool cleaner 10, as appropriate, may be operated by controller 50 to function as a proximate sensor.

For example, robotic pool cleaner 10a may be initially traveling as indicated by initial motion arrow 74a. Similarly, robotic pool cleaner 10b may be initially traveling as indicated by initial motion arrow 74b. When one or more sensors indicate that robotic pool cleaner 10a and robotic pool cleaner 10b are approaching one another, controller 50 of each robotic pool cleaner 10 may be configured to alter the direction of motion of that robotic pool cleaner 10. For example, the direction of motion of robotic pool cleaner 10a may be altered to the direction indicated by modified motion arrow 76a (in the example shown, a 90° turn to the right, other turning directions and angles may be used). Similarly, the direction of motion of robotic pool cleaner 10b may be altered to the direction indicated by modified motion arrow 76b. As another example, each robotic pool cleaner 10 may reverse its direction of travel (e.g., make a 180° turn or reverse the direction of propulsion to move backward). The modifications to the motions of the different robotic pool cleaners 10 may be selected so as to avoid entanglement of power cable 35 of one robotic pool cleaner 10 with another robotic pool cleaner 10, or with power cable 35 of the other robotic pool cleaner 10.

Alternatively or in addition to sensing the proximity of another robotic pool cleaner 10, each robotic pool cleaner 10 may be configured to establish contact with, e.g., communicate with or detect, one or more navigation signals. For example, a navigation signal may be emitted by a submerged beacon 82. In some cases, submerged beacon 82 may be configured to transmit a signal (e.g., an optical, acoustic, or electromagnetic signal) that is similar to a signal that is transmitted by each robotic pool cleaner 82. In some cases, submerged beacon 82 may include an immobilized robotic pool cleaner 10. In some cases, each robotic pool cleaner 10 may be configured to behave upon detecting approach to submerged beacon 82 as it would upon approaching another robotic pool cleaner 10.

In some cases, a navigation signal may be transmitted by a beacon 38 that is external to pool 34. In this case, contact with the navigation signal may be limited to times when one or more reception components (e.g., an antenna 70) are at waterline 42 of pool 34.

In some cases, an interior of pool 34 below waterline 42 may be provided with one or more optically, acoustically, or electromagnetically detectable features or landmarks. For example, the features may be configured to emit a detectable signal (e.g., optical or acoustic), to reflect a signal that is emitted by robotic pool cleaner 10, or that is otherwise detectable by a sensor or receiver of robotic pool cleaner 10.

Alternatively or in addition, each robotic pool cleaner 10 may be provided with one or more receivers that are extendible above waterline 42 of pool 34 to receive a navigation signal originating externally to pool 34. For example, a navigation signal may be created by a beacon 38 (e.g., optical, acoustic, radio, or other type of beacon), by GPS satellites (or by another satellite-based navigation system), or by one or more other local, regional, or global navigation systems signals.

For example, each robotic pool cleaner 10 may be provided with a floating unit 30. Floating unit 30 may be connected to robotic pool cleaner 10 by a tether 32. Tether 32, in addition to keeping floating unit 30 close to robotic pool cleaner 10, may enable communication between controller 50 and floating unit 30. Floating unit 30 may include floatation mechanism 48 for maintaining floating unit 30 at waterline 42. For example, floatation mechanism 48 may include an inflatable float, or another type of float that includes sufficient low density material to enable floating unit 30 to float at waterline 42. Floating unit 30 may include floating antenna 46 (which may represent two or more receivers or antennas of the same or of different types), and any required circuitry or other components for operation of floating antenna 46.

Since floating antenna 46 extends above waterline 42, floating antenna 46 may continually receive navigation signals. Therefore, controller 50 may be continuously provided with a current position of robotic pool cleaner 10. Floating antenna 46 may be utilized to communicate with floating antennas 46 of one or more similarly configured robotic pool cleaners 10, with an external device (e.g., in communication with fixed antenna 72), or another device.

For example, robotic pool cleaner 10a and robotic pool cleaner 10b may each be configured to operate in separate regions of pool 34. The regions may each be delimited by one or more region boundaries 78. (Although region boundary 78 is represented by a straight line, region boundary 78 may have a more complex closed or open shape. Where pool 34 is divided into three or more regions, more than one region boundary 78 may be defined.) Region boundary 78 may be defined according to one or more coordinate systems. Each robotic pool cleaner 10 may be configured to reverse direction, or otherwise alter its direction of travel, when approaching, meeting, or crossing region boundary 78.

Alternatively or in addition, a robotic pool cleaner 10 may be provided with a raisable antenna 70 that is configured to be raised occasionally or periodically to waterline 42. As used herein, a component such as raisable antenna 70, or another component of robotic pool cleaner 10, is considered to be raised to waterline 42 when the component is raised to or a above a depth below waterline 42 that enables communication by the component with a system external to pool 34 (e.g., via a radiofrequency signal or another signal whose transmission is limited in water).

For example, raisable antenna 70 may be mounted on an extendible (e.g., telescoping or segmented) mast that is operable to extend to or above waterline 42. For example, robotic pool cleaner 10 may be configured to periodically raise raisable antenna 70 to waterline 42.

As another example, raisable antenna 70 may be fixed to a part of robotic pool cleaner 10 that extends to waterline 42 when robotic pool cleaner 10 rises (e.g., climbs a wall 44) to waterline 42. For example, raisable antenna 70 may be incorporated into or attached to handle 16 or another part of cleaner body housing 12 or of robotic pool cleaner 10. Raisable antenna 70 may represent two or more receivers or antennas of the same or of different types, and which may be entirely enclosed by handle 16 or may extend outside of handle 16. Raisable antenna 70 may include, or may be connected to, any associated circuitry or other units (that may provide at least some of the functionality of controller 50).

Handle 16 may be sufficiently buoyant to float at waterline 42 when robotic pool cleaner 10 climbs a wall 44 of pool 34 to waterline 42. For example, the buoyancy of handle 16 may serve to stabilize a position or orientation of robotic pool cleaner 10 when operating at waterline 42 (e.g., to prevent tilting or flipping of robotic pool cleaner 10 when suction at intake 60 is insufficient to cause robotic pool cleaner 10 to adhere to the wall 44 of pool 34).

When raisable antenna 70 is raised to waterline 42, raisable antenna 70 may receive navigation signals (e.g., from navigation beacon 38 or from a satellite navigation system such as GPS). Controller 50 may be configured to identify a position of robotic pool cleaner 10, e.g., relative to region boundary 78 or relative to one or more other robotic pool cleaners 10, based on the received navigation signals. Controller 50 may then be configured to control movement of robotic pool cleaner 10 based on the identified position. Raisable antenna 70 may be configured to receive navigation signals when at or above waterline 42, or at a shallow depth to which the signals penetrate with sufficient intensity to enable navigation.

In some cases, when raisable antenna 70 is raised to waterline 42, raisable antenna 70 may be utilized for communication with other robotic pool cleaners 10 that are operating in pool 34. Alternatively or in addition, robotic pool cleaner 10 may communicate with other robotic pool cleaners 10 even when one or more of the robotic pool cleaners 10 are submerged. For example, each controller 50 may communicate with its corresponding fixed antenna 72 via power cable 35. Fixed antennas 72 may then enable constant intercommunication among robotic pool cleaners 10. For example, intercommunication among two or more robotic pool cleaners 10 may enable determining a distance between two robotic pool cleaners 10, an extrapolation of movement of two or more robotic pool cleaners 10 to a predicted meeting point, exchange of data (e.g., parts of pool 34 that were already cleaned, parameters related to operation of each robotic pool cleaner 10, or other data), or another result of intercommunication. As a result of the intercommunication, one or more robotic pool cleaners 10 may alter its speed or direction of travel.

Alternatively or in addition, each robotic pool cleaner 10 may be configured to communicate with a single system controller (e.g., located in an assembly that includes one or more power supplies 36, or elsewhere). The system controller may then coordination movement among different robotic pool cleaners 10. The system controller may send commands to controller 50 of each robotic pool cleaner 10 to alter or otherwise control motion of each robotic pool cleaner 10.

Controller 50 may be configured to operate robotic pool cleaner 10 such that raisable antenna 70 remains at waterline 42 until reception of a navigation signal or intercommunication with one or more other robotic pool cleaners 10 is complete.

Controller 50 may be configured to control robotic pool cleaner 10 in accordance with one or more methods for controlling a robotic pool cleaner 10 in a pool 34 in which multiple robotic pool cleaners 10 are operating.

Figure 4:
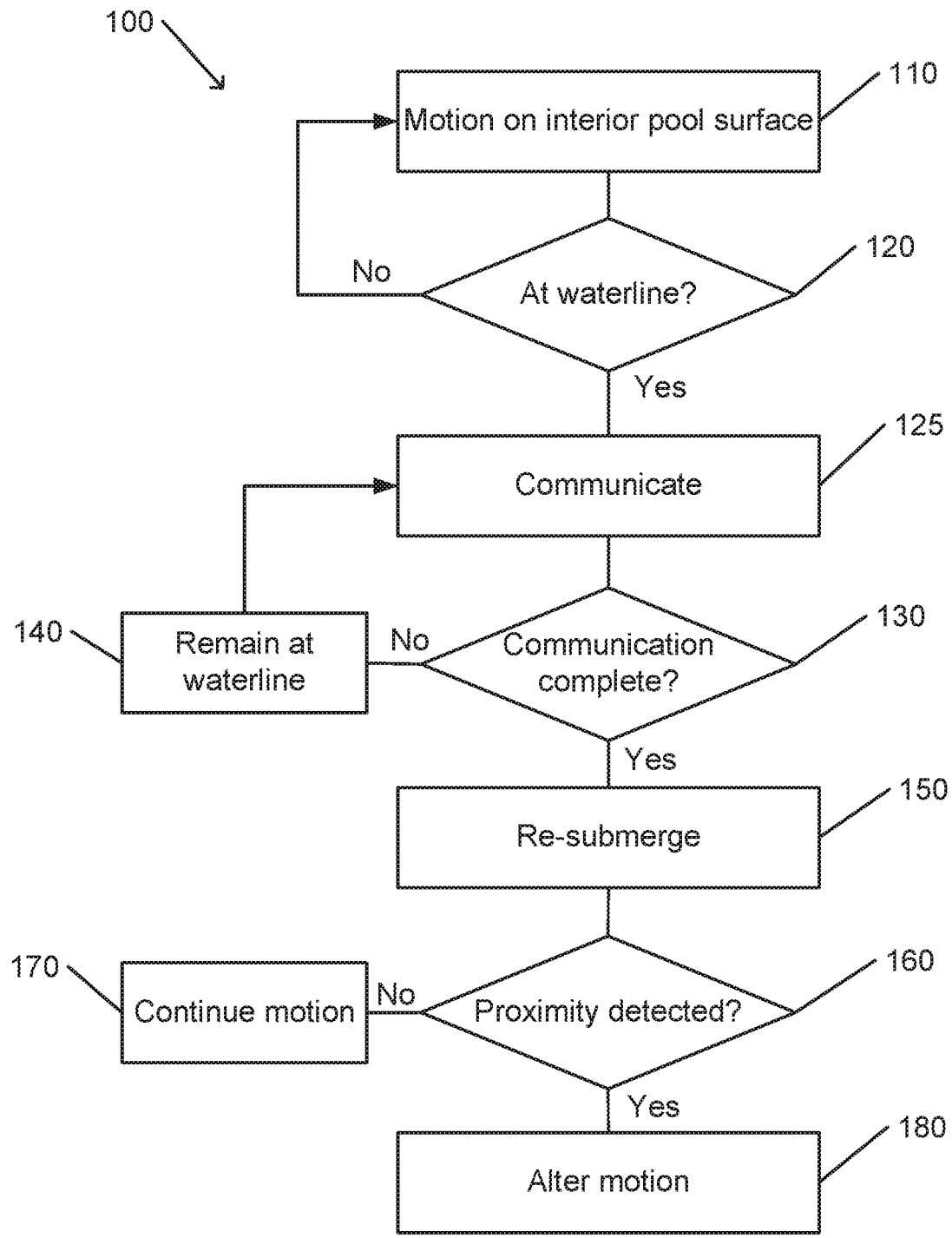
FIG. 4 is a flowchart depicting a method for controlling operation one of a plurality of robotic pool cleaners that are operating in a pool, in accordance with an embodiment of the present invention.

FIG. 4 is a flowchart depicting a method for controlling operation one of a plurality of robotic pool cleaners that are operating in a pool, in accordance with an embodiment of the present invention.

Pool cleaner control method 100 may be executed automatically by a processor 52 of a controller 50 of a robotic pool cleaner 10. In particular, pool cleaner control method 100 may be executed by a robotic pool cleaner 10 that includes a raisable antenna 70 that is configured for communication when robotic pool cleaner 10 reaches waterline 42 of a pool 34. Pool cleaner control method 100 may be executed continuously while robotic pool cleaner 10 is operating in a pool 34.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Pool cleaner control method 100 may be executed when robotic pool cleaner 10 is traveling on an interior surface (e.g., wall 44, floor, or other surface) of a pool 34 (block 110). For example, robotic pool cleaner 10 may be traveling upward or downward along a substantially vertical wall 44. The motion may include a component in a horizontal direction (e.g., to enable robotic pool cleaner 10 to apply suction to all surfaces of pool 34).

Controller 50 may monitor operation of one or more components of robotic pool cleaner 10 to determine if robotic pool cleaner 10 has reached waterline 42 such that raisable antenna 70 is extended to waterline 42 (block 120). For example, current that is applied to suction mechanism 62 may be indicative of whether only water or another liquid is being drawn into intake 60 (e.g., suction mechanism 62 is working hard and drawing a relatively large electric current from power supply 36), or whether air as well (reduction in drawn current, indicating input of air at waterline 42).

If robotic pool cleaner 10 has not reached waterline 42, the motion continues (block 110).

If robotic pool cleaner 10 has reached waterline 42, communication via raisable antenna 70 may be initiated (block 125). For example, raisable antenna 70 may be operated to attempt to receive a navigation signal from a navigation beacon 38, a satellite navigation system (e.g., GPS), or another navigation system. Alternatively or in addition, raisable antenna 70 may be operated to attempt to communicate with one or more other robotic pool cleaners 10 (e.g., for the purpose of exchanging data, e.g., position data).

Controller 50 may be configured to check whether communication is complete (block 130). For example, communication with a navigation system may be considered to be complete when controller 50 has identified a current position of robotic pool cleaner 10 based on receive navigation signals (e.g., after 10 seconds to 30 seconds for communication with GPS). Communication with another robotic pool cleaner 10 may be considered to be complete when all data has been exchanged between the robotic pool cleaners 10.

If communication is not yet complete, controller 50 may operate a propulsion mechanism of robotic pool cleaner 10 such that robotic pool cleaner 10 remains at waterline 42 (block 140). Communication may continue (block 125). For example, controller 50 may be configured to operate one or more of motor 56, transmission 58, wheels 14, or another component of the propulsion mechanism so as to provide upward propulsion to maintain robotic pool cleaner 10 at waterline 42.

In some cases, controller 50 may be configured to maintain robotic pool cleaner 10 at waterline 42 until communication is completed with another robotic pool cleaner 10. For example, controller 50 may be configured to maintain robotic pool cleaner 10 at waterline 42 until the other robotic pool cleaner 10 has emerged at waterline 42 (e.g., which may require waiting several minutes). Alternatively or in addition, controller 50 may be configured to maintain robotic pool cleaner 10 at waterline 42 to complete communication with another robotic pool cleaner 10, only if both robotic pool cleaners 10 are already at waterline 42 and have established communication (e.g., during a time period required to complete communication with a navigation signal, or during another predetermined period of time).

In some cases, programmed instructions for operation of processor 52 of controller 50 may define a timeout period. The duration of the time period may be determined by one or more parameters, which, in some cases, may be set by a user or operator of multiple cleaner pool cleaning system 80 or of robotic pool cleaner 10. For example, the time period may be set in accordance with dimensions of pool 34, operating characteristics of one or more robotic pool cleaners 10, or other characteristics or circumstances.

When communication with one or more of a navigation signal or one or more robotic pool cleaners 10 has been completed, controller 50 may operate robotic pool cleaner 10 to re-submerge (e.g., reverse its direction of travel, to turn, to cease or reduce application of upward forces, or otherwise) under waterline 42. A direction of travel may be modified to enable coverage of region of pool 34 that is adjacent to a region that was covered by robotic pool cleaner 10 prior to emerging at waterline 42.

In some cases, the communication may indicate a proximity of robotic pool cleaner 10 (block 160). For example, the indicated proximity may include is proximity to another robotic pool cleaner 10 or to a region boundary 78. Proximity to another robotic pool cleaner 10 may be defined as being at or within a predetermined minimum allowable distance from the other robotic pool cleaner 10. A minimum allowable distance may be constant, or may be determined by other factors (e.g., speed of travel or another factor). Proximity to a region boundary 78 may be defined as being at or crossing region boundary 78, or being within a predetermined minimum distance from region boundary 78.

When no such proximity is detected, motion of robotic pool cleaner 10 may continue as configured (block 170). For example, robotic pool cleaner 10 may continue moving in a pattern that is configured to cover and clean successive regions of pool 34.

When proximity is detected, the motion of robotic pool cleaner 10 may be altered prior to, during, or after re-submersion (block 180). The alteration may include changing a direction of travel or a speed of travel of robotic pool cleaner 10. For example, a direction of travel may be modified (e.g., reversed) in order to avoid crossing region boundary 78. A direction of travel may be altered in order to avoid excessively close approach to another robotic pool cleaner 10. In this case, the other robotic pool cleaner 10 may be similarly configured to alter its motion. The alteration of motion of the two (or more) robotic pool cleaners 10 may be coordinated such that entanglement of one or more power cables 35 with a robotic pool cleaner 10 or another power cable 35 is avoided.

After re-submersion and resumption of altered or unaltered motion, pool cleaner control method 100 may be executed again.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A robotic pool cleaner comprising:
   a housing;
   a propulsion mechanism configured to propel the robotic pool cleaner along an interior surface of a pool;
   a suction mechanism for drawing liquid from the pool into the housing;
   a transceiver configured to receive a first signal that is indicative of a relative location of another robotic pool cleaner and configured to transmit a second signal that is receivable by a transceiver of the other robotic pool cleaner; and
   a controller that is configured to control the propulsion mechanism in accordance with the indicated location of the other robotic pool cleaner,
   wherein the transceiver comprises at least one wire loop antenna, and wherein said at least one wire loop antenna comprises two wire loop antennas on different sides of the robotic pool cleaner, and wherein each of the two wire loop antennas is configured to generate an electromagnetic field whose polarity is opposite the electromagnetic field that is generated by the other wire loop antenna.

2. The robotic pool cleaner of claim 1, wherein each of the first signal and the second signal comprises a signal selected from a group of signal types consisting of optical, acoustic and electromagnetic.

3. The robotic pool cleaner of claim 1, wherein each of the signals comprises a pulsed signal.

4. The robotic pool cleaner of claim 1, wherein the controller is configured to control the propulsion mechanism to change a direction or speed of motion of that robotic pool cleaner when the received first signal is indicative of proximity of the other robotic pool cleaner.

5. A system for cleaning a pool, the system comprising a plurality of robotic pool cleaners, each robotic pool cleaner of said plurality of robotic pool cleaners comprising:
   a housing;
   a propulsion mechanism configured to propel said each robotic pool cleaner along an interior surface of a pool;
   a suction mechanism for drawing liquid from the pool into the housing;
   a transceiver configured to receive a signal that is indicative of a relative location of another robotic pool cleaner of said plurality of robotic pool cleaners; and
   a controller that is configured to control the propulsion mechanism in accordance with the indicated location of said another robotic pool cleaner.

6. The system of claim 5, wherein the transceiver of each robotic pool cleaner is further configured to receive a signal that is transmitted by a beacon and that is indicative of a relative location of the beacon.

7. The system of claim 6, wherein the controller is further configured to control the propulsion mechanism in accordance with the indicated location of the beacon.

* * * * *